United States Patent [19]
Reed

[11] 3,827,495

[45] *Aug. 6, 1974

[54] SAND STABILIZATION IN SELECTED FORMATIONS

[75] Inventor: Marion G. Reed, Hacienda Heights, Calif.

[73] Assignee: Chevron Research Company, San Francisco, Calif.

[ * ] Notice: The portion of the term of this patent subsequent to Sept. 7, 1988, has been disclaimed.

[22] Filed: Nov. 27, 1972

[21] Appl. No.: 309,875

Related U.S. Application Data

[63] Continuation of Ser. No. 177,263, Sept. 2, 1971, abandoned, Continuation-in-part of Ser. No. 875,026, Nov. 10, 1969, Pat. No. 3,603,399.

[52] U.S. Cl.............. 166/250, 166/281, 166/292, 166/294
[51] Int. Cl...................... E21b 33/138, E21b 43/27
[58] Field of Search............... 166/292, 305 R, 307; 252/8.55 R

[56] References Cited
UNITED STATES PATENTS

| | | | |
|---|---|---|---|
| 2,939,839 | 6/1960 | Brukner | 252/8.55 R |
| 3,013,607 | 12/1961 | Bond et al. | 166/292 X |
| 3,044,959 | 7/1962 | Martin | 252/8.55 R |
| 3,131,759 | 5/1964 | Slusser et al. | 166/305 R |
| 3,382,924 | 5/1968 | Veley et al. | 166/305 R |
| 3,406,115 | 10/1968 | White | 252/8.55 R |
| 3,572,416 | 3/1971 | Kinney et al. | 166/307 |

OTHER PUBLICATIONS

Veley, "How Hydrolyzable Metal Ions Stabilize Clays to Prevent Permeability Reduction," Society of Petroleum Engineers of AIME paper, Oct. 2, 1968, pp. 1–11.

Veley, "How Hydrolyzable Metal Ions React with Clays to Control Formation Water Sensitivity," JPT, Sept., 1969, pp. 1111–1117.

Primary Examiner—Stephen J. Novosad
Attorney, Agent, or Firm—Ralph L. Freeland, Jr.; Edward J. Keeling

[57] ABSTRACT

The disclosure provides a method of sand stabilization in certain selected clay-containing formations by treating the formation with a hydroxy-aluminum solution having a ratio of the hydroxyl groups to the aluminum atoms in the range of from 1.5 to 2.7.

44 Claims, 16 Drawing Figures

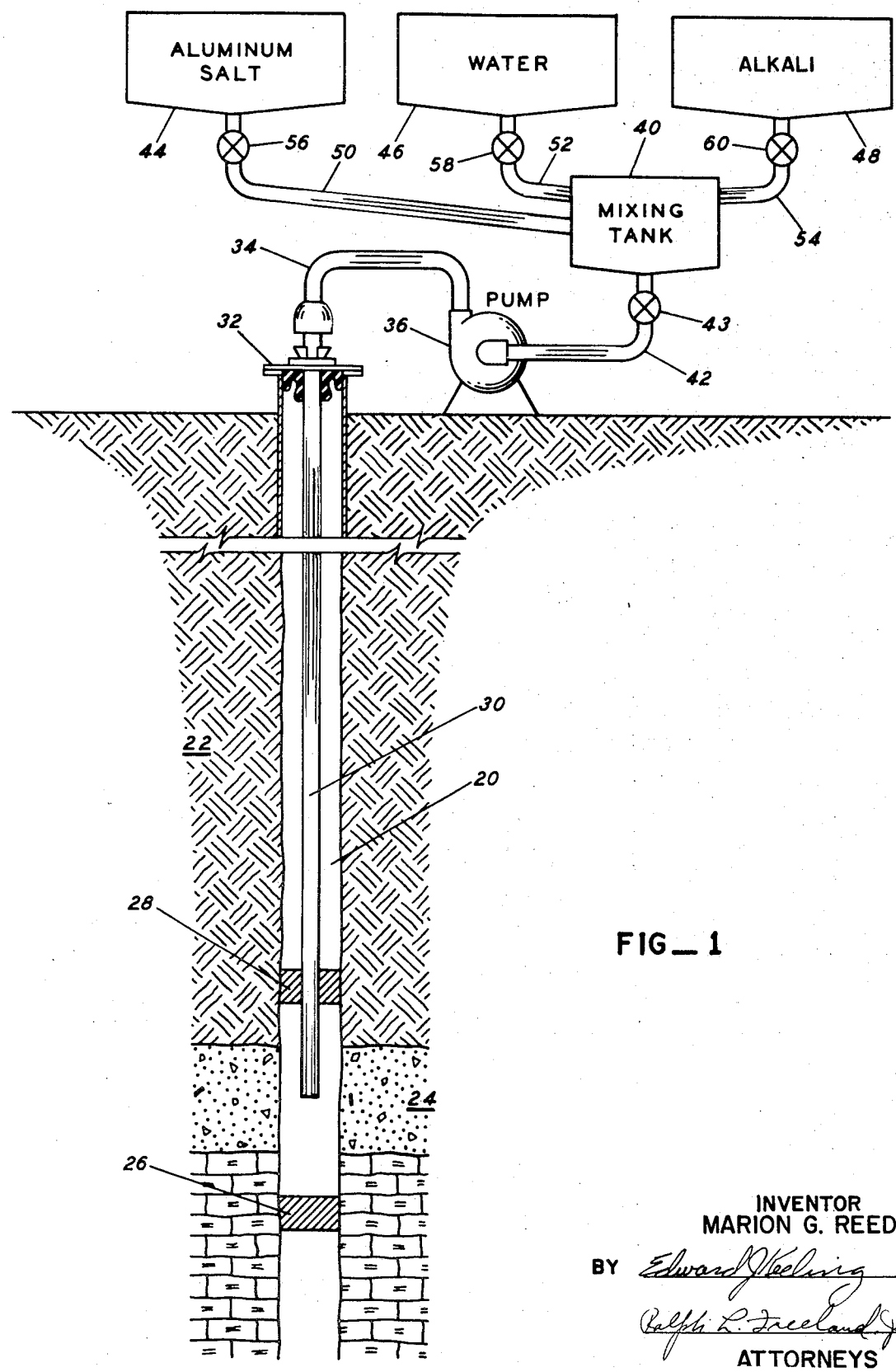
FIG_1

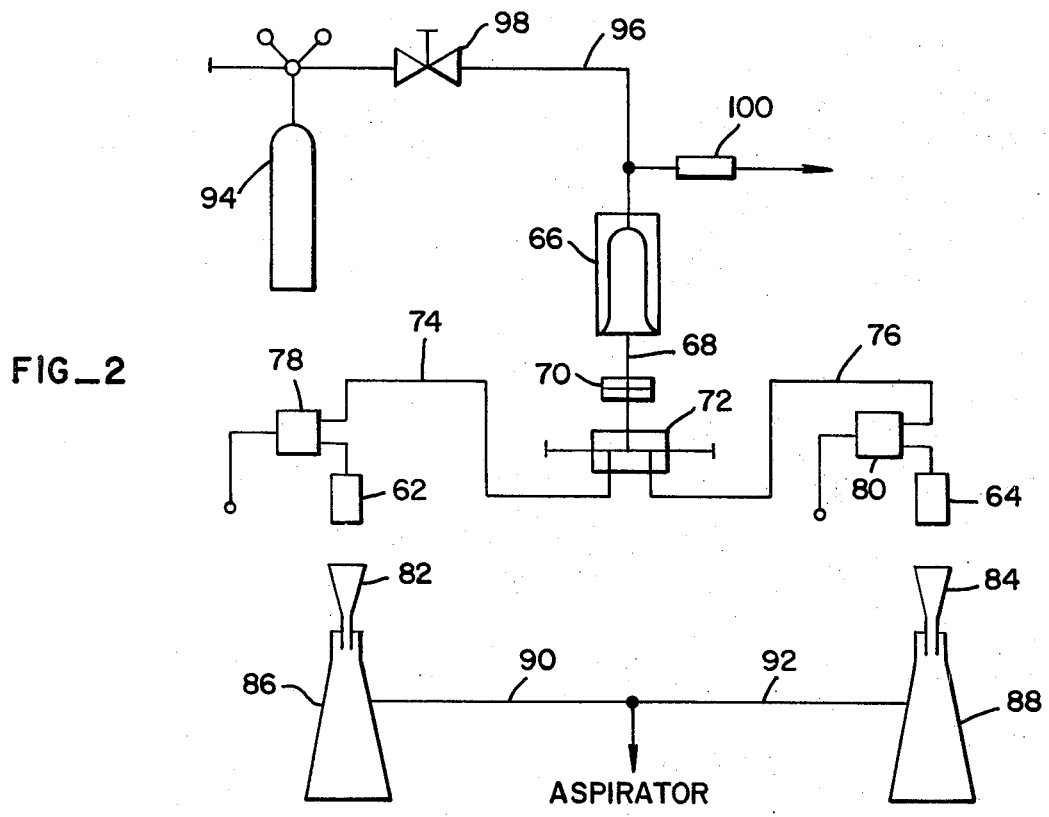
FIG_2
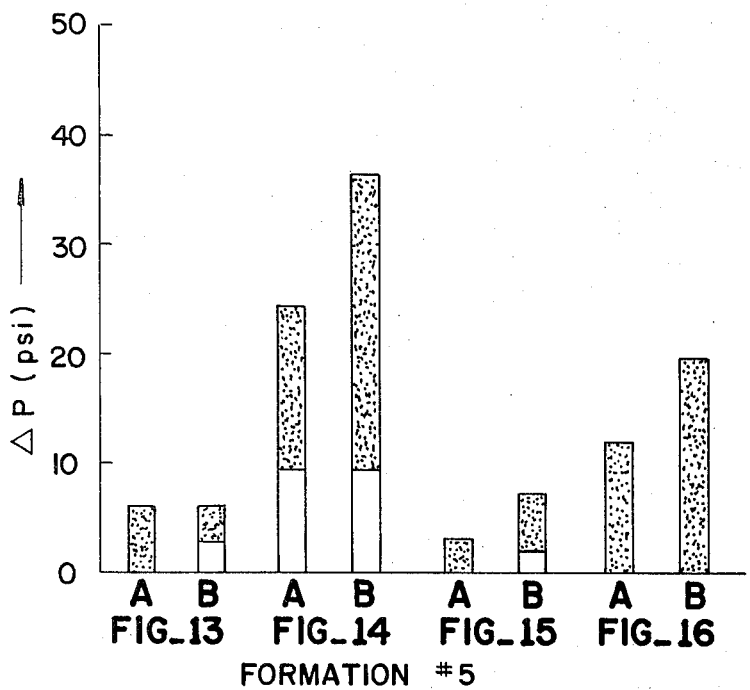
FORMATION #5

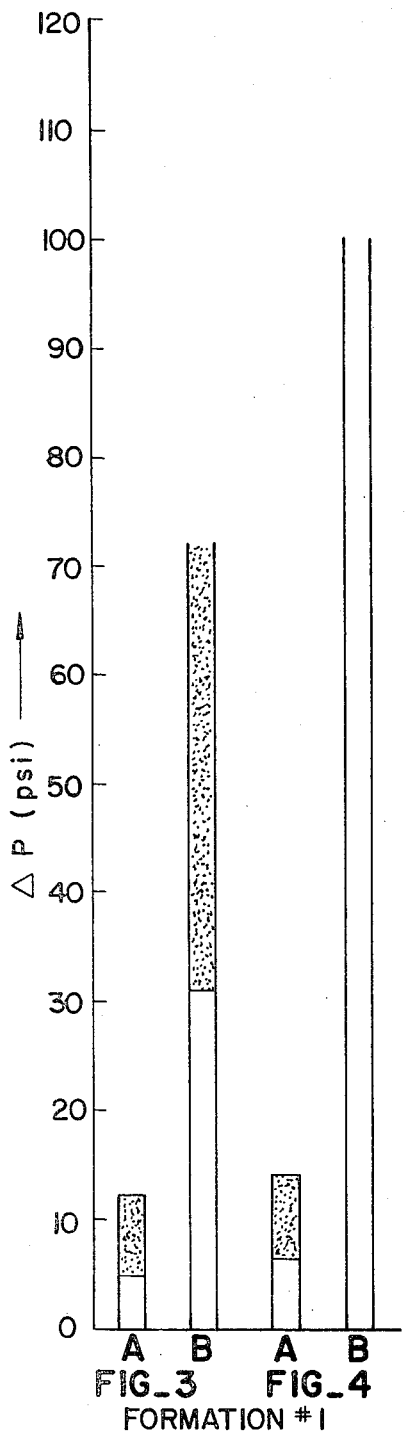
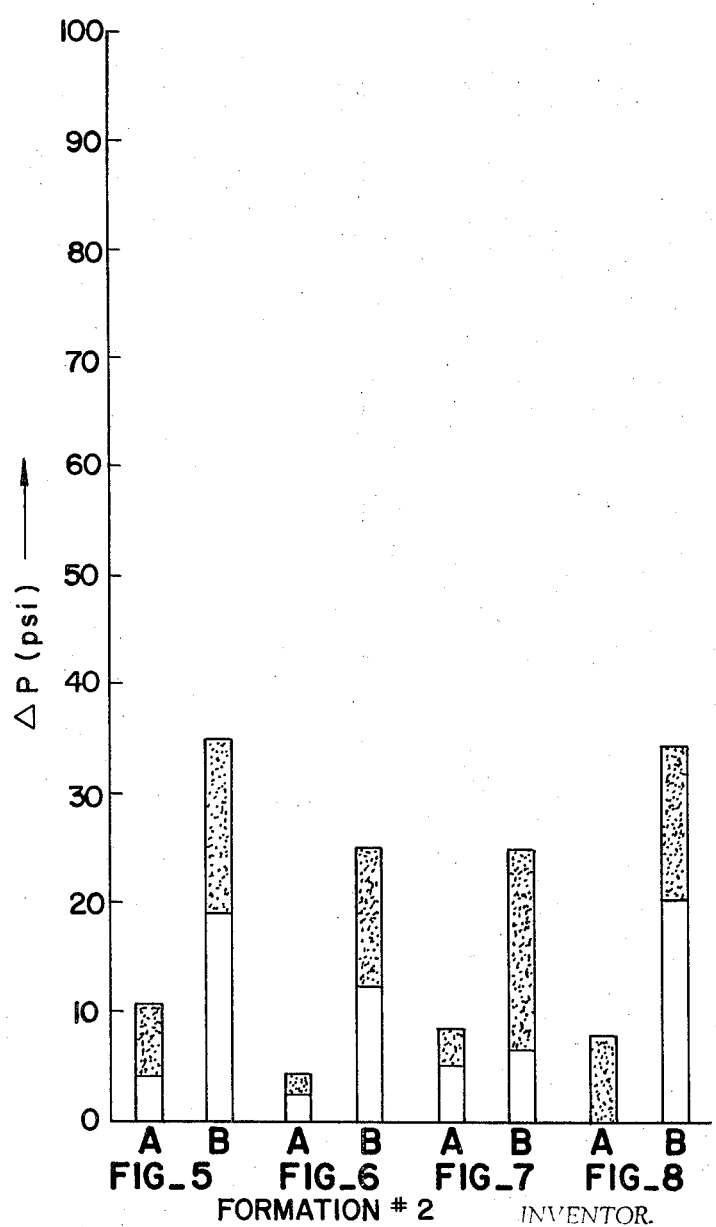

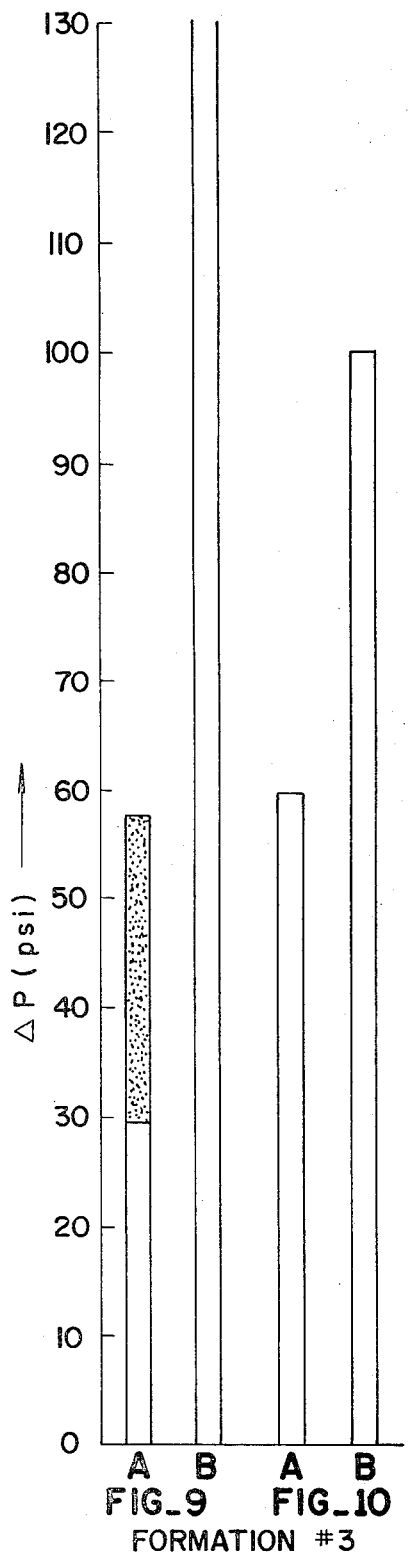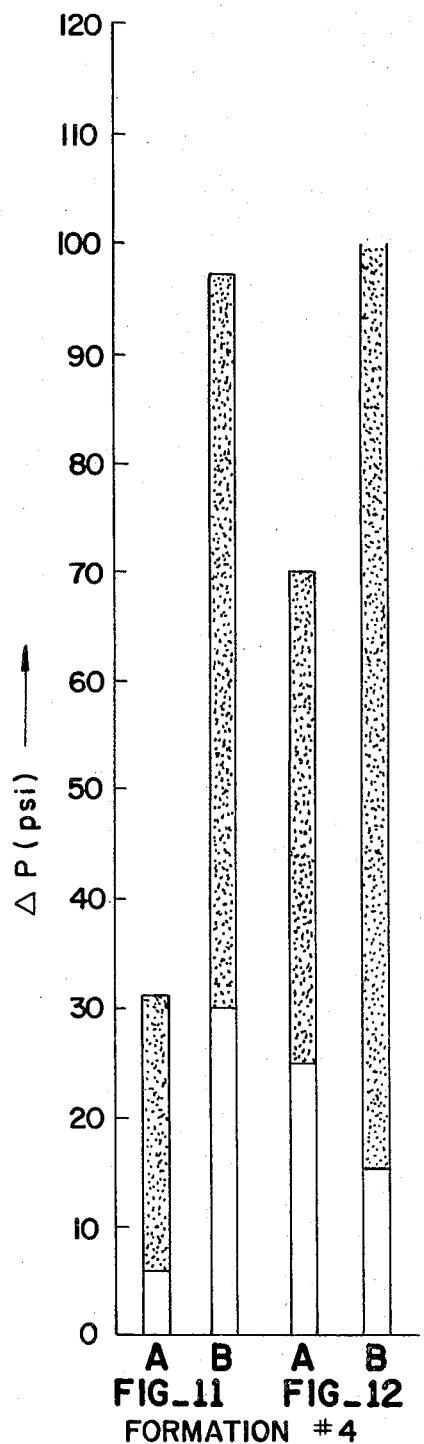
FIG_9  FIG_10
FORMATION #3
FIG_11  FIG_12
FORMATION #4

SAND STABILIZATION IN SELECTED FORMATIONS

RELATED APPLICATIONS

This application is a continuation of application, Ser. No. 177,263 filed Sept. 2, 1971, now abandoned, which is a continuation in part of application Ser. No. 875,026, filed Nov. 10, 1969, and now U.S. Pat. No. 3,603,399 issued Sept. 7, 1971. This application is related to application Ser. No. 130,689, filed Apr. 2, 1971, now abandoned. The contents of these applications are incorporated herein by reference.

BACKGROUND OF THE INVENTION

This invention relates to a method of stabilizing sand in clay mineral containing formations penetrated by a well and, more particularly, the invention provides for stabilizing sand in such a formation by injecting down a well and contacting with the formation a hydroxy-aluminum solution having a ratio of hydroxyl groups to aluminum atoms in the range of from 1.5 to 2.7.

In petroleum-producing operations, wells which penetrate oil-bearing formations are used to provide connection with the formation and the surface. Sand or other material may migrate into production wells through which formation fluids are brought to the surface. This sand production is very undesirable because it tends to obstruct flow into the well from the formation and to do damage to the production equipment when the sand is produced along with the formation materials. Many of these formations also contain clay minerals of different types and in various amounts. The equilibrium of these clay minerals is often drastically disturbed on contact with water. Serious permeability losses can occur should the clay minerals obstruct flow by either expanding to fill pore spaces or by dispersing and lodging in pore constrictions. Oftentimes structural expansion occurs when additional water is absorbed between clay layers. If large amounts of expanding-type or swelling clays are present, a very significant fraction of the flow channels may be closed by the increased clay volume.

Clay particle migration is believed to be even a more serious damage mechanism than clay swelling. This is particularly true because substantial amounts of damage can be done by this mechanism when there is only a small amount of clay present in the formation. Clay particles dispersed in the flow channels are carried downstream until they lodge in pore constrictions. Permeability of the formation is reduced by means of these particles forming minature filter cakes and filling these pore constrictions.

A specific force acting on the expanding or swelling clays to expand the structure is caused by the affinity of the exchangeable interlayer cations and interlayer surfaces for water. Heretofore, organic cations such as amines have been used to decrease this tendency of the clays to expand on contact with fresh water by replacing the exchangeable cations with cations less inclined to attract water to interlayer sites. However, the organic cations have been not entirely satisfactory because they are expensive and they are also displaced from the clay surfaces after time by reservoir brines.

Another force which causes both structural expansion of clays and particle dispersion of clays results from the inherent negative charge on almost all clay minerals. This charge is neutralized by adsorption of cations on clay surfaces. Since the cations tend to dissociate, a positive ion swarm is established in the solution near the surface of the particle and a negative charge exists within the particle. This is normally referred to as an electric double layer. Particles with such double layers repel each other and they tend to disperse. Since the strength of repulsion is directly related to the dissociative tendency of the absorbed cations, more firmly attached cations tend to decrease the double layer thickness and thus to reduce the tendency of the particles to disperse. This nullifies the inherent negative charge on the clay surface. Heretofore, multivalent cations such as calcium have been used to treat water to sensitive formations. However, these cations are readily exchangeable from clay surfaces by reservoir brines and thus give only temporary protection under most conditions.

In my copending application Ser. No. 875,026, filed Nov. 10, 1969 and now U.S. Pat. No. 3,603,399, issued Sept. 7, 1971, a method of stabilizing these water-sensitive clays was disclosed and claimed. Briefly this method provided for contacting a formation containing such water-sensitive clays with a hydroxy-aluminum solution having a ratio of the hydroxyl groups to the aluminum atoms in the range of from 1.5 to 2.7.

It has now been found that in certain clay-containing formations where there are sanding problems, that sand stabilization can be obtained by hydroxy-aluminum treatment. Thus in accordance with the present invention sand stabilization can be done in certain clay mineral containing formations.

BRIEF DESCRIPTION OF THE INVENTION

The present invention provides a method of stabilizing sand in clay-containing formations penetrated by a well. A formation which contains sand and clay minerals is selected and it is determined whether the formation is susceptible to stabilization on reaction with a hydroxy-aluminum solution. If such is the case, an aqueous hydroxy-aluminum solution is injected down the well and the formation is contacted with the solution to stabilize sand in the formation. The ratio of the hydroxyl groups to Al atoms in the hydroxy-aluminum solution is in the range of from 1.5 to 2.7. The ratio is preferably maintained at from 2.0 to 2.4 in field operations.

In one aspect the susceptibility of the formation to sand stabilization by hydroxy-aluminum treatment is established by first obtaining at least two samples of the formation. One of the samples is treated with an aqueous hydroxy-aluminum solution and the other sample left untreated. Both samples are prepared for comparative flow tests. The flow tests are conducted on the samples to determine if the treated sample is significantly sand stabilized compared to the untreated sample. If such is the case a hydroxy-aluminum solution is injected down a well penetrating the formation and the formation is contacted with the solution to stabilize sand in said formation.

In another aspect the susceptibility of a formation to sand stabilization by hydroxy-aluminum treatment is established by obtaining a sample of such formation and analyzing such sample for clay minerals and X-ray amorphous material. In most formations the X-ray amorphous material is largely very fine grained and poorly crystaline clay minerals which are also favorably affected by hydroxy-aluminum treatment. When a formation has at least 5.0 weight percent total clay minerals and X-ray amorphous material, such formation is susceptible to sand stabilization by the present method. Therefore, an aqueous hydroxy-aluminum solution is injected down a well penetrating the formation and the solution is contacted with the formation to stabilize sand in the formation.

In still another aspect the susceptibility of a formation to sand stabilizing by hydroxy-aluminum treatment is determined by selecting a sample of the formation and determining the Cation Exchange Capacity (C.E.C.) of the clay in the sample. When the C.E.C. is greater than about 0.6 milliequivalents per 100 grams it is susceptible to sand stabilization by hydroxy-aluminum treatment. An aqueous hydroxy-aluminum solution is then injected down a well penetrating the formation and it is contacted with the solution to stabilize sand in the formation.

The hydroxy-aluminum solution of the present invention has a ratio of the hydroxyl groups to aluminum atoms in the range of from 1.5 to 2.7. A highly preferred ratio of hydroxyl groups to aluminum atoms is from 2.0 to 2.4. In a typical application, a formation penetrated by a well is treated with a solution formed by adding to water a quantity of aluminum salts selected from the group consisting of aluminum chloride, aluminum bromide, aluminum iodide, aluminum nitrate, aluminum sulfate, and aluminum acetate, in an amount of between 0.01 and 24.0 pounds of aluminum per barrel of water to form an aluminum salt solution and then adding to such water an alkali or alkaline earth base in an amount of between 0.95 and 1.7 pounds of hydroxyl ion for each pound of aluminum to form a hydroxy-aluminum solution. The aforesaid hydroxy-aluminum solution is injected down the well and into the formation to stabilize the sand in the formation. In many instances it is desirable to follow the injection of the hydroxy-aluminum solution with an injection of fresh water and to age the treated formation in the fresh water. The well in some cases is shut-in during such aging to permit polymerization of the hydroxy-aluminum solution in the formation to stabilize the sand in the formation.

OBJECTS OF THE INVENTION

It is a particular object of the present invention to provide a method of stabilizing a formation containing sand and clays by contacting the formation with an aqueous hydroxy-aluminum solution. Further objects and advantages of the present invention will become apparent from reading the following detailed description in view of the accompanying drawings which are made a part of this specification.

BRIEF DESCRIPTION OF THE DRAWINGS

FIG. 1 illustrates in schematic form an earth formation penetrated by a well which well has connected thereto apparatus for performing the method of the present invention;

FIG. 2 is a schematic view of apparatus for conducting flow tests on core samples in accordance with one form of the invention;

FIG. 3 is a dual bar graph illustrating difference in sand flow between a treated sample and an untreated sample;

FIG. 4 is a dual bar graph illustrating difference in sand flow between a treated sample and an untreated sample;

FIG. 5 is a dual bar graph illustrating difference in sand flow between a treated sample and an untreated sample;

FIG. 6 is a dual bar graph illustrating difference in sand flow between a treated sample and an untreated sample;

FIG. 7 is a dual bar graph illustrating difference in sand flow between a treated sample and an untreated sample;

FIG. 8 is a dual bar graph illustrating difference in sand flow between a treated sample and an untreated sample;

FIG. 9 is a dual bar graph illustrating difference in sand flow between a treated sample and an untreated sample;

FIG. 10 is a dual bar graph illustrating difference in said flow between a treated sample and an untreated sample;

FIG. 11 is a dual bar graph illustrating difference in sand flow between a treated sample and an untreated sample;

FIG. 12 is a dual bar graph illustrating difference in sand flow between a treated sample and an untreated sample;

FIG. 13 is a dual bar graph illustrating difference in sand flow between a treated sample and an untreated sample;

FIG. 14 is a dual bar graph illustrating difference in sand flow between a treated sample and an untreated sample;

FIG. 15 is a dual bar graph illustrating difference in sand flow between a treated sample and an untreated sample;

FIG. 16 is a dual bar graph illustrating difference in sand flow between a treated sample and an untreated sample.

DETAILED DESCRIPTION OF THE INVENTION

The invention finds its utility in a well environment to stabilize sand intermixed with clays in formations of interest penetrated by the well. Referring specifically to the drawings, a well 20 penetrating an earth formation 22 is shown. The well 20 penetrates a producing formation 24 which, for example, may contain sand intermixed with clays and X-ray amorphous material which move into the well and decreases production from the well. Depending on the configuration of the well, it may be provided with suitable packers 26 and 28 above and below the producing formation 24. In many instances, packers will not be required. A tubing string 30 provides fluid communication from the surface through wellhead 32 to the producing formation 24. Suitable surface tubing 34 connects the tubing string 30 with the discharge of a suitable pump 36.

A mixing tank 40 is connected to the intake of the pump 36 by a suitable conduit 42. A valve 43 controls flow from the mixing tank 40 through conduit 42 to the pump 36. The mixing tank 40 receives the materials for preparing the hydroxy-aluminum solution. In accordance with the present invention therefor, means 44 defining a source of aluminum salt, means 46 defining a source of water and means 48 defining a source of alkali or alkaline earth base are connected by suitable conduits to the mixing tank. Thus suitable tubing 50, 52 and 54 having adjustable valves 56, 58 and 60, respectively, provides for the flow of the components from their respective sources to mixing tank 40 for the formation therein of the hydroxy-aluminum solution. A preferred method and apparatus for use in preparing hydroxy-aluminum solutions is disclosed in my copending application Ser. No. 130,689, filed Apr. 2, 1971, now abandoned.

It has been found that sand stabilization in formations penetrated by a well can be obtained by contacting certain selected formations with a hydroxy-aluminum solution prepared in accordance with the present invention. The hydroxy-aluminum solution should have a ratio of the hydroxyl groups to the aluminum atoms in the range of from 1.5 to 2.7. A highly preferred ratio is 2.0 to 2.4. In a typical application, the formation is treated with a solution formed by mixing water first with a quantity of aluminum salts selected from the group consisting of aluminum chloride, aluminum bromide, aluminum iodide, aluminum nitrate, aluminum sulfate and aluminum acetate. The selected salt is added in an amount of between 0.01 and 24.0 pounds of aluminum per barrel of water to form an aluminum solution. To this aluminum solution is added an alkali or an alkaline earth base in an amount of between 0.95 and 1.7 pounds of hydroxyl ion for each pound of aluminum to form a hydroxy-aluminum solution. The aforesaid hydroxy-aluminum solution is formed in the manner hereinafter described in a suitable mixing tank and is then injected down the well and into the formation to stabilize sand in the formation.

In practicing the method of the present invention a hydroxy-aluminum solution is prepared by bringing together solutions of an aluminum salt and an alkali or alkaline base in a high shear zone. In the preferred form the hydroxy-aluminum (OH-Al) solution is prepared in a high shear mixer by proportioned mixing of solutions of aluminum chloride ($AlCl_3$) and sodium hydroxide (NaOH). The OH-Al solution may be prepared in any concentration below its saturation value; however, a 20X concentrate containing about 97 lb/bbl $AlCl_3$ (275 gm/liter) is the most practical. Commercially available 32.2 Be $AlCl_3$ solution (28.1 percent by wt) and 49.5 Be NaOH solution (50 percent by wt) are recommended reagents. The exact quantities of these reagents will depend on their concentration, purity and desired OH/Al ratio of the product. If a product with an OH/Al ratio of 2.0 is desired, the ratio of actual $AlCl_3$ to actual NaOH must be 1.66 (lbs $AlCl_3$/lbs. NaOH). A method and apparatus for preparing hydroxy-aluminum solution is described in detail in copending applcation Ser. No. 130,689, supra.

In most instances, it is desirable to immediately follow the injection of the hydroxy-aluminum solution with an injection of fresh water into the well and into the formation. The water used should be fresh in the sense that the dissolved solids content should be low to obtain the best results. Thus, if available, drinking water is preferred. However, even sea water which contains about 35,000 ppm dissolved solids will have some beneficial effect. It is high preferred though that the fresh water should have less than 1,000 ppm total dissolved salt content and the treated formation should be closed in to allow for aging of the hydroxy-aluminum. Periods of aging of as little as three hours add substantially to the resulting stabilization of a formation. It is usually preferred to age a treated formation for 24 to 48 hours.

FIG. 2 is a schematic illustration of apparatus useful in determining the susceptibility of a formation to sand stabilization by hydroxy-aluminum treatment. The apparatus provides for flowing fluid through adjacent formation samples 62 and 64. Thus adjacent samples of core material of suitable size are prepared for flow therethrough. It is preferred to utilize samples curved out from rubber sleeve core barrel samples. A core 1 inch long and 0.3 square inches in cross section is of adequate size. The cores are cased in resin and placed in aluminum sleeve. The downward end of the core is left unsupported. A membrane accumulator 66 provides liquid from its interior through filter 70 to manifold 72. The two stem manifold valve 72 divides flow into lines 74 and 76 to cores 62 and 64, respectively. Differential pressure transducers 78 and 80 are used to give pressure data on the flow. The effluent liquid flows through Buchner funnels 82 and 84 into flask 86, 88 and the produced sand collects on the filter. A high filtration rate is maintained keeping filter flasks 86 and 88 practically evacuated by an aspirator. Overflow liquid is removed by an aspirator through lines 90 and 92. A pressure source 94 is connected to the membrane accumulator 66 by conduit 96. Valve 98 and pressure relief valve 100 are placed on conduit 96.

In order to determine the susceptibility of a formation to sand stabilization by hydroxy-aluminum, adjacent samples of formation material are flow tested. For example, core samples may be taken from rubber core barrel sleeve and used in the flow tests. The cores used in the flow tests described herein were about 1 inch long and varied between 0.3 to 0.9 square inches cross-sectional surface area. The pairs of treated and untreated cores which are compared in a given flow test, however, should be very similar in size. The samples of the formation are cased in resin within aluminum tubing. All cores are supported on one end with an aluminum screen which, in turn, is supported by a perforated aluminum plate. The two cores are placed in 1N NaCl (about 60,000 ppm) and are vacuum saturated. After saturation one core is treated with hydroxy-aluminum solution and displaced with and aged 24 hours in fresh water. During the hydroxy-aluminum treatment flow is in the direction toward the end plates. The treated core and the untreated core are mounted as indicated in FIG. 2 so that the flow is vertically downwards through them. During the flow tests, flow is in the direction toward the unsupported end of the core. 1N brine is flowed through each core and the pressure drop and flow rate are measured along with a description of how much sand is concurrently produced from the core. Flow tests on treated and untreated cores as described above were run on cores from five different formations. The results of the tests on these different formations are shown graphically in FIGS. 3-16. The data from the untreated core is illustrated as A in each figure, while the data from the treated core is illustrated as B. The white portion of the bar graphs indicate competency of a core to the pressure differential indicated on the Y axis of the figure. The dotted portion of the graph indicates some sand flow from the bottom of the core, while the terminal line indicates complete core failure. Tables I – V below set out data for the flow tests of Formations 1 – 5. This data is illustrated as follows:

Formation 1 by FIGS. 3A, 3B, 4A, 4B;

Formation 2 by FIGS. 5A, 5B, 6A, 6B, 7A, 7B, 8A, 8B;

Formation 3 by FIGS. 9A, 9B, 10A, 10B;

Formation 4 by FIGS. 11A, 11B, 12A and 12B, and

Formation 5 by FIGS. 13A, 13B, 14A, 14B, 15A, 15B, 16A and 16B.

The pressure drops at which some sand started flowing and at core failure if it occurred are illustrated graphically in FIGS. 3–16. Table II presents data obtained from flow tests on Formation 1 material which had been fired to 400°C to reduce clay activity. Table VII gives formation classification information and Table VIII gives complete X-ray diffraction data on the five formations.

Referring specifically to FIGS. 3A, 3B, 4A and 4B, results of the present method in the formation are shown. The data obtained from the four cores illustrated in FIGS. 3 and 4 indicate that the hydroxy-aluminum treatment was quite successful in stabilizing the cores. These data are fully set out in Table I. Formation 1 is in a Gulf Coast oilfield and the core sample was taken from the depth of 8459 to 8497 feet. An X-ray diffraction analysis of Formation 1 is set out in Table VIII. A clay mineral and X-ray amorphous material summary as well as the C.E.C. for Formation 1 is shown in Table VII. It is noted that the C.E.C. is 2.0 Meq/100 gm while the clay mineral and amorphous contents of the core in weight percent were 5.0 and 7.0, respectively.

The data shown in Table I indicate that the hydroxy-aluminum treatment was very successful in sand stabilizing cores of the formation. Thus, core No. 3A which was untreated, began to flow substantial sand at a very low pressure drop of 4.5 psi. The core substantially disintegrated when the pressure drop was only 12 psi. Conversely, the treated core 3B withstood a pressure drop of 72 psi with only some slight sanding occurring. The core never did disintegrate. The results obtained with cores 3A and 3B were confirmed by additional flow tests done in cores 4A and 4B. Core 4A began sanding at about 8.9 psi and substantially disintegrated at 14 psi. The treated core 4B on the other hand withstood the pressure drop of 100 psi without flowing substantial sand. It is noted that 100 psi was the limit of the equipment used in this test.

The results of core floods on cores from Formation 2 are shown in FIGS. 5 through 8. Formation 2 is from a Gulf Coast field and cores were taken from a depth between 7210 and 7223. Cores 5A to 8A, inclusive, were untreated, and cores 5B to 8B were treated with hydroxy-aluminum as described above. An X-ray diffraction analysis for Formation 1 is set out in Table VII. The clay mineral and X-ray amorphous material summary as well as the C.E.C. is shown in Table VII. In that respect, the C.E.C. of Formation 2 is 1.9 milliequivalents per 100 grams. The clay content of the Formation 2 is 1.9 weight percent and the amorphous material content of the core is 16.0 percent. Referring to the bar graphs A and B in FIGS. 5 through 8, it is noted that the untreated cores illustrated in bars A broke down substantially sooner than the treated cores of bar B. While the results indicated by pressure drop are not quite as spectacular as those obtained in Formation 1, the increase in sand stability is very substantial in Formation 2. This is particularly seen by examining the flow rate data of Table II. This parameter is even more indicative of sand stabilization in a formation subject to fluid flow than pressure drop. Thus the treated cores (B) will withstand 3 to 12 times the flow rate of the untreated (A) cores.

FIGS. 9A, 9B, 10A and 10B show the effect of sand stabilization by hydroxy-aluminum treatment in Formation No. 3. Formation 3 is a Gulf Coast formation and the cores were taken at a depth of 6754 feet. The bar graphs of FIGS. 9 and 10 show that the hydroxy-aluminum treatment is quite successful in sand stabilizing Formation 3. These data are fully set out in Table III. A complete X-ray diffraction analysis of Formation 3 is given in Table VIII. As shown in Table VII the C.E.C. of Formation 3 was 8.9 Meq/100 gm., while the clay material was 7.8 percent and the X-ray amorphous content was 16 percent.

Formation 4 is a Southern California formation and the cores were taken at a depth of 3509 feet. Flow test data are shown in FIGS. 11A, 11B, 12A and 12B. The hydroxy-aluminum treatment was successful here in stabilizing sand in the formation. This data is set out in Table IV. An X-ray diffraction analysis of the formation is shown in Table VIII. The data from Table VII indicates that the C.E.C. was 3.4 Meq/100 gm. Clay present in the formation amounted to 4.5 weight percent, and the X-ray amorphous material was 22.0 percent.

FIG. 12B illustrates that some slight sanding occurred in the treated core at a relatively low pressure drop. However, the flow rates of fluid through the parallel treated (B) core and the untreated (A) core was more than triple when substantially sanding occurred.

Formation 5 is a Gulf Coast formation and the cores were taken from a depth of 6778 feet. The data obtained from the eight core floods of FIGS. 13 – 16 indicate that the hydroxy-aluminum treatment was only very slightly successful in stabilizing sand. The X-ray diffraction data of Table VIII shows that Formation 5 has a very low clay mineral content of only 1.0 weight percent and a relatively low X-ray amorphous material content of 4.0 weight percent. From Table VII it is seen that the C.E.C. of Formation 5 is only 0.6 Meq/100 gm.

Table VI shows flow data for core samples of Formation No. 1 which sample had been fired to 400°C for 8 hours to partially deactivate the clay minerals. This was done to test the hypothesis that clay is the active agent in the sand stabilization in accordance with the invention. The reduced flow rates and pressure drops in the treated cores over those of Table I indicate that this is the case.

In accordance with the present invention, the susceptibility of a formation to sand stabilization by hydroxy-aluminum treatment can be determined by parallel core floods of treated and untreated cores as discussed above and as set out in the drawings and Tables. In addition, from the above data it is evident that formations having a very low C.E.C., i.e., Formation 5, of only 0.6 Meq/100 gm are not attractive candidates for hydroxy-aluminum treatment. Further, a low clay mineral content combined with a low X-ray amorphous material content indicate the treatment will not be beneficial. Thus Formation 5 having a clay content of 1.0 weight percent and amorphous material content of 4.0 weight percent received only very slight sand stabilization after a hydroxy-aluminum treatment. Thus if the C.E.C. of a formation is above 0.6 and preferably above 1.0, sand stabilization by hydroxy-aluminum treatment of the formation is expected. Further, when the clay mineral content in weight percent plus the X-ray amorphous content in weight percent are more than 5.0 weight percent, and preferably more than 10.0 weight percent, an effective hydroxy-aluminum treatment of the formation is expected.

TABLE I

CORE DATA: FORMATION I
  Core Depth 8459-97'
  Core 3B, 4B hydroxy-aluminum treated
  Core 3A, 4A untreated
  Average Filter Paper wt, g.=6.6702/30=0.2223 g.

FLOW DATA:

| Core No. | $\Delta P$ PSI | Volume, cc. | Time Sec. | Flow Rate cc/Min. | Throughput, cc | Filter No. | Filter weight + Sample, g. | Sand weight g |
|---|---|---|---|---|---|---|---|---|
| 3A | 0.3 | 5.0 | 29.5 | 10.2 | 30 | | | |
| | 4.5 | | | | | | | |
| | 7.2 | 10.0 | 8.2 | 73.2 | | 32 | 0.3357 | 0.1134 |
| | 9.0 | 10.0 | 6.8 | 88.2 | | 33 | 0.3203 | 0.0980 |
| | 12.0 | 10.0 | 5.2 | 115.4 | | 34 | 0.2660 | 0.0437 |
| | | | | | | 35 | 0.6531 | 0.4308 |
| 3B | 0.3 | 5.7 | 126.6 | 2.70 | 65 | | | |
| | 1.4 | 5.0 | 19.5 | 15.4 | 145 | | | |
| | 3.3 | 10.0 | 19.7 | 30.5 | | | | |
| | 8.7 | 10.0 | 8.0 | 75.0 | | | | |
| | 19.2 | 10.0 | 4.3 | 139.6 | | | | |
| | 22.0 | 10.0 | 3.8 | 157.9 | | | | |
| | 32 | 25.0 | 6.3 | 238.1 | | 36 | 0.2151 | −0.0072 |
| | 72 | | | | | 37 | 0.2400 | 0.0177 |
| | | | | | | 38 | 0.2247 | 0.0024 |
| 4A | 1.1 | 3.0 | 177.6 | 1.01 | 12 | 24 | 0.2240 | 0.0017 |
| | 3.9 | 5.0 | 110.3 | 2.72 | | 27 | 0.2282 | 0.0059 |
| | 6.2 | 5.0 | 63.1 | 4.75 | 70 | | | |
| | 8.9 | 5.0 | 38.2 | 7.85 | 170 | 29 | 0.2498 | 0.0275 |
| | 14 | | | | 250 | 31 | 2.0073 | 1.7850 |
| 4B | 1.1 | 5.0 | 101.0 | 2.97 | 55 | | | |
| | 1.9 | | | | 100 | | | |
| | 4.3 | | | | | | | |
| | 9.9 | 5.0 | 17.4 | 17.2 | 300 | | | |
| | 17.9 | 5.0 | 9.6 | 31.3 | 450 | | | |
| | 24.2 | 25.0 | 35.6 | 42.1 | 600 | 25 | 0.2346 | 0.0123 |
| | 35.8 | 25.0 | 24.6 | 60.9 | 950 | 26 | 0.2243 | 0.0020 |
| | 47.8 | 25.0 | 17.9 | 83.8 | 1100 | | | |
| | 61.5 | 25.0 | 13.7 | 109.5 | 1350 | 28 | 0.2346 | 0.0123 |
| | 79.2 | 25.0 | 10.7 | 140.2 | 1750 | | | |
| | 95.2 | 25.0 | 9.0 | 166.7 | | | | |
| | 100.3 | 25.0 | 8.2 | 182.9 | 2000 | 30 | 0.2310 | 0.0087 |

TABLE II

CORE DATA: FORMATION II
  Core Depth 7210-23'
  Cores 5B, 6B Hydroxy-Aluminum Treated
  Cores 5A, 6A Untreated

FLOW DATA:

| Core No. | $\Delta P$ PSI | Volume, cc. | Time Sec. | Flow Rate cc/Min. | Throughput, cc | Filter No. | Filter weight + Sample, g. | Sand Weight g |
|---|---|---|---|---|---|---|---|---|
| 5A | 2.5 | 5.0 | 87.9 | 3.41 | <100 | | | |
| | 3.8 | 5.0 | 50.7 | 5.92 | <150 | 2 | 0.3037 | 0.0814 |
| | 7.2 | 5.0 | 23.8 | 12.6 | 200 | 3 | 2.6143 | 2.3920 |
| | 9.2 | 5.0 | 16.1 | 18.6 | 300 | | | |
| | 9.1 | 5.0 | 15.7 | 19.1 | 500 | 5 | 0.6397 | 0.4174 |
| | 10.4 | | | | 550 | 6 | 7.2604 | 7.0381 |
| 5B | 2.7 | 5.0 | 68.1 | 4.41 | <100 | | | |
| | 3.9 | 5.0 | 37.9 | 7.91 | <200 | | | |
| | 5.2 | 5.0 | 27.7 | 10.8 | 300 | 1 | 0.2787 | 0.0564 |
| | 6.9 | 5.0 | 21.4 | 14.0 | 325 | | | |
| | 8.7 | 5.0 | 16.5 | 18.2 | 375 | | | |
| | 11.5 | 5.0 | 13.2 | 22.7 | 625 | 4 | 0.2581 | 0.0358 |
| | 14.6 | 5.0 | 10.2 | 29.4 | | | | |
| | 19.0 | 5.0 | 7.1 | 42.3 | | 7 | 0.2516 | 0.0293 |
| | 29.4 | 10.0 | 9.2 | 65.2 | 1150 | 8 | 3.2182 | *2.9959 |
| | 35 | | | | 1450 | 9 | 4.0118 | 3.7895 |

*A large chunk of sand broke off.

| | | | | | | | | |
|---|---|---|---|---|---|---|---|---|
| 6A | 2.6 | 5.0 | 35.7 | 8.40 | 50 | 11 | 0.3320 | 0.1097 |
| | 3.6 | 5.0 | 20.5 | 14.6 | 100 | 13 | 3.6819 | 3.4596 |
| | 3.9 | | | | | 14 | 7.1975 | 6.9752 |
| 6B | 0.6 | 5.0 | 37.9 | 7.92 | 50 | 10 | 0.2646 | 0.0423 |
| | 1.1 | 5.0 | 22.6 | 13.3 | 125 | | | |
| | 1.4 | 5.0 | 19.2 | 15.6 | 250 | | | |
| | 1.3 | 5.0 | 18.4 | 16.3 | 300 | | | |
| | 1.9 | 5.0 | 14.1 | 21.3 | 350 | | | |

TABLE II—Continued

CORE DATA: FORMATION II
- Core Depth 7210-23′
- Cores 5B, 6B Hydroxy-Aluminum Treated
- Cores 5A, 6A Untreated

FLOW DATA:

| Core No. | ΔP PSI | Volume, cc. | Time Sec. | Flow Rate cc/Min. | Throughput, cc | Filter No. | Filter weight + Sample, g | Sand Weight g |
|---|---|---|---|---|---|---|---|---|
|  | 2.9 | 5.0 | 9.6 | 31.2 | 400 |  |  |  |
|  | 3.7 | 10.0 | 14.8 | 40.5 | 500 | 12 | 0.2520 | 0.0297 |
|  | 4.7 | 10.0 | 11.4 | 52.6 | 620 | 15 | 0.2715 | 0.0492 |
|  | 5.8 | 10.0 | 9.1 | 65.9 | 780 | 16 | 0.2463 | 0.0240 |
|  | 8.6 | 10.0 | 6.5 | 92.3 | 1100 | 17 | 0.2735 | 0.0512 |
|  | 11.7 | 25.0 | 11.7 | 128.2 | 1400 | 18+20 | 1.8816 | 1.4370 |
|  | 14.7 | 25.0 | 9.4 | 159.6 | 2100 | 21 | 0.2804 | 0.0581 |
|  | 17.7 | 25.0 | 7.6 | 197 | 2500 | 22 | 1.8735 | 1.6512 |
|  | 25 |  |  |  |  | 23 | 3.3262 | 3.1039 |
| 7A | 2.0 | 5.0 | 77.5 | 3.87 | <50 | 40 | 0.9783 | 0.7473 |
|  | 3.2 | 5.0 | 50 | 6.00 |  |  |  |  |
|  | 3.1 | 5.0 | 55.3 | 5.42 | <100 | 41 | 0.2802 | 0.0452 |
|  | 4.6 | 5.0 | 36.5 | 8.21 |  | 43 | 0.2648 | 0.0363 |
|  | 5.1 | 5.0 | 33.1 | 9.06 | <299 | 45 | 0.2758 | 0.0605 |
|  | 7.0 | 5.0 | 21.6 | 13.9 | 250 | 46 | 0.3738 | 0.1586 |
|  | *8.6 | 5.0 | 15 | 20 | 375 | 47 | 5.6900 | 5.4642 |

*Approximate Flow Rate

| Core No. | ΔP PSI | Volume, cc. | Time Sec. | Flow Rate cc/Min. | Throughput, cc | Filter No. | Filter weight + Sample, g | Sand Weight g |
|---|---|---|---|---|---|---|---|---|
| 7B | 0.6 | 5.0 | 86.9 | 3.45 | <50 |  |  |  |
|  | 1.2 | 5.0 | 56.6 | 5.30 | <100 | 39 | 0.2524 | 0.0384 |
|  | 2.9 | 5.0 | 25.2 | 11.9 |  | 42 | 0.2719 | 0.0579 |
|  | 3.8 | 5.0 | 20.1 | 14.9 | 300 |  |  |  |
|  | 5.0 | 5.0 | 14.2 | 21.1 | 400 |  |  |  |
|  | 6.0 | 5.0 | 12.2 | 24.6 | 525 | 44 | 0.2848 | 0.0641 |
|  | 8.0 | 5.0 | 8.9 | 33.7 | 600 | 48 | 0.8889 | 0.6615 |
|  | 9.0 | 5.0 | 7.6 | 39.5 | 800 | 49 | 0.4847 | 0.2488 |
|  | 10.2 | 5.0 | 6.4 | 46.9 | 1100 | 50 | 0.2629 | 0.0483 |
|  | 13.3 | 10.0 | 10.0 | 60.0 | 1200 | 51 | 0.2668 | 0.0381 |
|  | 15.9 | 10.0 | 8.0 | 75.0 | 1350 | 52 | 0.5237 | 0.3029 |
|  | 15.7 | 10.0 | 7.5 | 80.0 | 1675 | 53 | 0.5268 | 0.3097 |
|  | 19.9 | 10.0 | 5.9 | 101.7 | 2100 | 54 | 1.7911 | 1.5759 |
|  | 25.0 |  |  |  | 2550 | 55 | 2.5120 | 2.2866 |
| 8A | 2.1 | 5.0 | 55.2 | 5.43 | <50 | 56 | 0.2762 | 0.0515 |
|  | 2.8 | 5.0 | 35.5 | 8.45 | <100 | 58 | 0.2808 | 0.0536 |
|  | 3.4 | 5.0 | 32.0 | 9.37 | 150 | 59 | 0.2741 | 0.0551 |
|  | 4.2 | 5.0 | 24.0 | 12.5 | 180 | 60 | 0.2771 | 0.0437 |
|  | 5.0 | 5.0 | 14.6 | 20.5 | 200 | 61 | 2.1944 | 1.9647 |
|  | 6.6 | 5.0 | 10.5 | 28.6 | 325 | 62 | 1.8446 | 1.5946 |
|  | 8.1 |  |  |  | 600 | 63 | 1.4903 | 1.2749 |
| 8B | 2.0 | 5.0 | 59.2 | 5.07 | <50 |  |  |  |
|  | 2.9 | 5.0 | 39.6 | 7.58 | <100 |  |  |  |
|  | 3.3 | 5.0 | 36.4 | 8.24 | 150 |  |  |  |
|  | 4.4 | 5.0 | 29.0 | 10.3 | 180 |  |  |  |
|  | 5.0 | 5.0 | 24.7 | 12.1 | 220 |  |  |  |
|  | 6.4 | 5.0 | 19.3 | 15.5 | 250 |  |  |  |
|  | 8.8 | 5.0 | 13.1 | 22.9 | 350 | 57 | 0.3171 | 0.0923 |
|  | 11.1 | 5.0 | 10.8 | 27.8 | 400 | 64 | 0.2679 | 0.0393 |
|  | 14.1 | 5.0 | 8.7 | 34.5 | 550 |  |  |  |
|  | 17.0 | 5.0 | 7.0 | 42.9 | 600 | 65 | 0.2629 | 0.0357 |
|  | 20.2 | 5.0 | 5.5 | 54.5 | 700 | 66 | 1.8579 | 1.6310 |
|  | 24.2 | 10.0 | 9.4 | 63.8 | 850 | 67 | 0.2800 | 0.0627 |
|  | 28.6 | 10.0 | 7.4 | 81.1 | 1000 |  |  |  |
|  | 34 |  |  |  |  | 68 | 3.5620 | 3.3338 |

TABLE III

CORE DATA: FORMATION III
- Core Depth 6754′
- Cores 9B, 10B Hydroxy-Aluminum Treated
- Cores 9A, 10A Untreated

FLOW DATA:

| Core No. | ΔP PSI | Volume, cc. | Time Sec. | Flow Rate cc/Min. | Throughput, cc | Filter No. | Filter Weight + Sample, g | Sand Weight g |
|---|---|---|---|---|---|---|---|---|
| 9A | 11.0 | 5.0 | 374.8 | 0.800 | <50 | 70 | 0.2500 | 0.0284 |
|  | 31.4 | 5.0 | 126.0 | 2.38 |  |  |  |  |
|  | 29.2 | 5.0 | 137.1 | 2.19 | 150 | 71 | 1.4496 | 0.2157 |
|  | 38.9 | 5.0 | 101.9 | 2.94 |  |  |  |  |
|  | 36.1 | 5.0 | 118.5 | 2.53 | 325 | 72 | 0.2936 | 0.0646 |
|  | 39.9 | 5.0 | 111.5 | 2.69 | 500 |  |  |  |
|  | 55 |  |  |  | 625 | 74 | 3.3900 | 3.1651 |
| 9B | 62.2 | 5.0 | 297.9 | 1.01 | <50 |  |  |  |
|  | 98.1 | 5.0 | 97.1 | 3.09 |  |  |  |  |
|  | 93.7 | 5.0 | 100.3 | 2.99 | 150 | 69 | 0.2543 | 0.0269 |
|  | 102.5 | 5.0 | 82.7 | 3.63 |  |  |  |  |
|  | 96.1 | 5.0 | 101.5 | 2.96 | 335 |  |  |  |
|  | 101.6 | 5.0 | 103.5 | 2.90 | 540 |  |  |  |
|  | *130 |  |  |  | 700 | 73 | 0.2562 | 0.0280 |

TABLE III – Continued

CORE DATA: FORMATION III
  Core Depth 6754'
  Cores 9B, 10B Hydroxy-Aluminum Treated
  Cores 9A, 10A Untreated

FLOW DATA:

| Core No. | ΔP PSI | Volume, cc. | Time Sec. | Flow Rate cc/Min. | Throughput, cc. | Filter No. | Filter Weight + Sample, g | Sand Weight g |
|---|---|---|---|---|---|---|---|---|
| *Epoxy bond to side of core broke loose. | | | | | | | | |
| 10A | 12.2 | 3.0 | 371.4 | 0.808 | <25 | | | |
| | 16.8 | 5.0 | 360.2 | 0.833 | <50 | | | |
| | 36.8 | 5.0 | 183.4 | 1.64 | <100 | | | |
| | *59.6 | | | | 100 | 75 | 3.5582 | 3.3434 |
| *Broke through between epoxy to core bond with a piece of the core coming with it. | | | | | | | | |
| 10B | 12.1 | 3.0 | 529.5 | 0.566 | <25 | | | |
| | 27.6 | 5.0 | 301.1 | 0.996 | <50 | | | |
| | 42.1 | 5.0 | 170.6 | 1.76 | <100 | | | |
| | 61.4 | 5.0 | 107.4 | 2.79 | 100 | | | |
| | 70.4 | 5.0 | 89.1 | 3.37 | | | | |
| | 82.9 | 5.0 | 65.2 | 4.60 | 200 | | | |
| | 100.6 | 5.0 | 50.2 | 5.98 | 250 | | | |
| | 100.4 | 5.0 | 54.9 | 5.46 | 675 | 76 | 0.2680 | 0.0412 |

TABLE IV

CORE DATA: FORMATION IV
  Core Depth 3509'
  Cores 11B, 12B Hydroxy-Aluminum Treated
  Cores 11A, 12A Untreated

FLOW DATA:

| Core No. | ΔP PSI | Volume, cc. | Time Sec. | Flow Rate cc/Min. | Throughput, cc | Filter No. | Filter Weight + Sample, g | Sand Weight g |
|---|---|---|---|---|---|---|---|---|
| 11A | 2.3 | 5.0 | 38.6 | 7.77 | <50 | | | |
| | 2.2 | 5.0 | 41.3 | 7.26 | <100 | | | |
| | 3.4 | 5.0 | 23.0 | 13.0 | <100 | | | |
| | 4.8 | 5.0 | 15.2 | 19.6 | <150 | | | |
| | 6.6 | 5.0 | 10.8 | 27.8 | 200 | 243 | 0.3238 | 0.0998 |
| | 9.4 | 5.0 | 7.0 | 42.9 | 275 | 244 | 0.3655 | 0.1416 |
| | 12.0 | 10.0 | 10.9 | 55.0 | 400 | 246 | 0.2582 | 0.0298 |
| | 14.8 | 10.0 | 8.6 | 69.8 | 750 | 248 | 0.4357 | 0.2130 |
| | 23.4 | 10.0 | 3.4 | 88.2 | 1200 | 251 | 0.3290 | 0.1046 |
| | .32 | | | | 1700 | 252 | 0.4521 | 0.2287 |
| 11B | 1.9 | 5.0 | 108.2 | 2.77 | <50 | | | |
| | 4.9 | 5.0 | 39.0 | 7.69 | <100 | | | |
| | 8.0 | 5.0 | 21.4 | 14.0 | <150 | | | |
| | 13.1 | 5.0 | 13.3 | 22.6 | 200 | | | |
| | 17.6 | 5.0 | 9.8 | 30.6 | 250 | | | |
| | 29.3 | 5.0 | 6.0 | 50.0 | 350 | 242 | 0.2635 | 0.0312 |
| | 41.1 | 10.0 | 8.6 | 69.8 | 500 | 245 | 0.2621 | 0.0427 |
| | 55.9 | 10.0 | 5.6 | 107 | 1000 | 247 | 0.5933 | 0.3708 |
| | 77.7 | 10.0 | 4.7 | 128 | 1400 | 249 | 0.2532 | 0.0393 |
| | 95.0 | | | | 2000 | 250 | 0.4638 | 0.2340 |
| 12A | 2.6 | 5.0 | 167.6 | 1.29 | <50 | | | |
| | 8.8 | 5.0 | 42.5 | 7.05 | <100 | | | |
| | 11.4 | 5.0 | 32.8 | 9.15 | <150 | | | |
| | 16.3 | 5.0 | 22.2 | 13.5 | <200 | | | |
| | 25.7 | 5.0 | 13.1 | 22.9 | <200 | 254 | 0.2647 | 0.0379 |
| | 35.2 | 5.0 | 8.81 | 34.1 | 250 | 255 | 0.2594 | 0.0370 |
| | 51.7 | 5.0 | 5.8 | 51.7 | 475 | 257 | 0.2704 | 0.0567 |
| | 70.0 | | | | 625 | 259 | 1.1097 | 0.8894 |
| 12B | 2.1 | 5.0 | 63.5 | 4.72 | <50 | | | |
| | 2.2 | 5.0 | 62.4 | 4.81 | <100 | | | |
| | 3.8 | 5.0 | 42.6 | 7.04 | <150 | | | |
| | 6.0 | 5.0 | 24.9 | 12.0 | <200 | | | |
| | 4.1 | 5.0 | 16.3 | 18.4 | <200 | | | |
| | 16.2 | 5.0 | 9.0 | 33.0 | 250 | 253 | 0.2500 | 0.0343 |
| | 23.9 | 5.0 | 6.3 | 47.6 | 450 | 256 | 0.2610 | 0.0373 |
| | 32.3 | 5.0 | 5.0 | 60.0 | 700 | 258 | 0.2681 | 0.0373 |
| | 42.0 | 10.0 | 8.1 | 74.1 | 800 | | | |
| | 59.7 | 10.0 | 5.8 | 103 | 1000 | 260 | 0.2845 | 0.0573 |
| | 72.7 | 10.0 | 5.0 | 120 | 1200 | 261 | 0.2665 | 0.0411 |
| | 92.6 | 25. | 10.2 | 147 | 1450 | 262 | 0.5698 | 0.3466 |
| | 100.2 | 25.0 | 9.9 | 151 | 1700 | 263 | 0.2610 | 0.0455 |

TABLE V

CORE DATA: FORMATION V
  Core Depth 6778'
  Cores 13B, 14B, 15B, 16B Hydroxy-Aluminum Treated
  Cores 13A, 14A, 15A, 16A Untreated Note that Cores 13A, 13B, 14A and 14B are sand packs made from the loose sand. They were pressed using 5000 psig surface pressure. The time the pressure was applied was very short.
Note that Cores 15A, 15B, 16A and 16B are sand packs made from the loose sand and compressed at 5000 psi for 16 hours.

FLOW DATA:

| Core No. | ΔP PSI | Volume, cc. | Time Sec. | Flow Rate cc/Min. | Throughput, cc | Filter No. | Filter Weight + Sample, g | Sand Weight g |
|---|---|---|---|---|---|---|---|---|
| 13A | 0.2 | 5.0 | 416.7 | 0.72 | <25 | 77 | 1.3093 | 1.085 |
|  | 0.8 | 5.0 | 150.0 | 2.00 | <50 |  |  |  |
|  | 1.4 | 5.0 | 96.0 | 3.2 | <100 | 79 | 0.2419 | 0.0273 |
|  | 1.8 | 5.0 | 68.9 | 4.35 | 150 | 80 | 0.2553 | 0.0276 |
|  | 2.8 | 5.0 | 50.7 | 5.92 | <200 |  |  |  |
|  | 3.9 | 5.0 | 36.5 | 8.21 | <200 | 81 | 0.2525 | 0.0300 |
|  | 4.4 | 5.0 | 30.2 | 9.93 | 225 | 84 | 0.4183 | 0.1888 |
|  | 5.3 | 5.0 | 24.4 | 12.3 | 325 | 86 | 0.2712 | 0.0526 |
|  | 6.2 | 5.0 | 19.9 | 15.1 | 350 |  |  |  |
|  | 6.4 | 5.0 | 16.5 | 8.2 | 450 | 87 | 1.8773 | 1.6608 |
|  | 4.9 | 5.0 | 11.8 | 25.4 | 625 |  |  |  |
|  | 3.7 | 5.0 | 6.4 | 46.9 | 800 | 89 | 1.2377 | 1.0158 |
|  | 3.2 | 25.0 | 9.9 | 151.5 | 1500 | 90 | 0.7653 | 0.5495 |
| 13B | 0.2 | 5.0 | 276.8 | 1.08 | <25 |  |  |  |
|  | 0.6 | 5.0 | 139.3 | 2.15 | <50 |  |  |  |
|  | 1.0 | 5.0 | 83.5 | 3.59 | <100 |  |  |  |
|  | 1.5 | 5.0 | 64.1 | 4.68 | 150 |  |  |  |
|  | 2.2 | 5.0 | 40.7 | 7.37 | <200 |  |  |  |
|  | 2.4 | 5.0 | 36.2 | 8.29 | <200 | 82 | 0.2470 | 0.0276 |
|  | 3.4 | 5.0 | 25.2 | 11.9 | 200 | 83 | 1.4123 | 1.1981 |
|  | 4.6 | 5.0 | 19.6 | 15.3 | 375 |  |  |  |
|  | 4.5 | 5.0 | 20.1 | 14.9 | 450 |  |  |  |
|  | 5.1 | 5.0 | 18.4 | 16.3 | 500 | 85 | 0.2433 | 0.0232 |
|  | 5.9 | 5.0 | 15.8 | 19.0 | 575 |  |  |  |
|  | 3.1 | 5.0 | 28.2 | 10.6 | 710 |  |  |  |
|  | 5.6 | 5.0 | 16.6 | 18.1 | 825 |  |  |  |
| 14A | 0.5 | 2.0 | 156.4 | 0.77 |  | 94 | 1.2081 | 0.9955 |
|  | 0.8 | 3.0 | 179.9 | 1.00 | <50 |  |  |  |
|  | 2.1 | 5.0 | 143.6 | 2.09 | <100 |  |  |  |
|  | 3.1 | 5.0 | 49.0 | 3.03 | 100 |  |  |  |
|  | 4.5 | 5.0 | 68.1 | 4.41 | 150 |  |  |  |
|  | 6.1 | 5.2 | 48.5 | 6.19 | 175 |  |  |  |
|  | 8.9 | 5.0 | 30.2 | 9.93 |  | 95 | 0.2495 | 0.0338 |
|  | 8.9 | 5.0 | 27.8 | 10.8 | 200 | 97 | 0.5215 | 0.3051 |
|  | 12.0 | 5.0 | 17.2 | 17.4 | 320 | 99 | 0.6623 | 0.4400 |
|  | 18.6 | 5.0 | 9.2 | 32.6 | 400 | 100 | 0.8494 | 0.6392 |
|  | 17.1 | 10.0 | 21.1 | 28.4 | 635 | 101 | 0.7594 | 0.5350 |
|  | 23.4 | 10.0 | 9.0 | 66.6 | 900 | 102 | 2.0882 | 1.8671 |
| 14B | 0.5 | 2.0 | 171.6 | 0.70 |  |  |  |  |
|  | 1.2 | 3.0 | 136.2 | 1.32 | <50 |  |  |  |
|  | 2.0 | 5.0 | 136.1 | 2.20 | <100 |  |  |  |
|  | 3.1 | 5.0 | 92.1 | 3.26 | 100 |  |  |  |
|  | 4.6 | 5.0 | 60.6 | 4.95 | 125 |  |  |  |
|  | 6.1 | 5.0 | 46.0 | 6.52 | 150 |  |  |  |
|  | 8.6 | 5.0 | 28.8 | 10.4 |  | 93 | 0.2490 | 0.0301 |
|  | 9.1 | 5.0 | 24.0 | 12.5 | 200 | 96 | 1.3544 | 1.1336 |
|  | 12.6 | 5.0 | 16.9 | 17.8 | 300 |  |  |  |
|  | 18.8 | 5.0 | 10.6 | 28.3 | 425 |  |  |  |
|  | 17.1 | 10.0 | 22.0 | 27.3 | 625 | 98 | 0.2706 | 0.0472 |
|  | 23.7 | 10.0 | 16.2 | 37.0 | 725 |  |  |  |
|  | 31.0 | 10.0 | 11.4 | 52.6 | 900 |  |  |  |
|  | 36.2 | 25.0 | 24.8 | 60.5 | 1050 |  |  |  |
| 15A | <0.1 | 5.0 | 32.7 | 9.17 | <50 | 265 | 0.2546 | 0.0309 |
|  | 0.2 | 5.0 | 25.5 | 11.8 | <100 |  |  |  |
|  | 0.4 | 5.0 | 20.1 | 14.9 | <150 |  |  |  |
|  | 0.6 | 5.0 | 16.8 | 17.9 | <200 | 266 | 0.4471 | 0.2244 |
|  | 1.0 | 5.0 | 12.9 | 23.3 | 250 | 267 | 0.8472 | 0.6323 |
|  | 1.5 | 5.0 | 9.4 | 31.9 | 400 | 269 | 0.5381 | 0.3173 |
|  | 2.3 | 5.0 | 6.7 | 44.8 | 450 | 271 | 0.9170 | 0.6834 |
|  | 3.4 |  |  |  |  | 272 | 1.7953 | 1.5711 |
| 15B | <0.1 | 5.0 | 34.0 | 8.82 | <50 |  |  |  |
|  | 0.2 | 5.0 | 22.1 | 13.6 | <100 |  |  |  |
|  | 0.4 | 5.0 | 18.3 | 16.4 | <150 |  |  |  |
|  | 0.6 | 5.0 | 14.8 | 20.3 | <200 |  |  |  |
|  | 1.0 | 5.0 | 11.3 | 26.5 | 250 | 264 | 1.2356 | 1.0087 |
|  | 1.4 | 5.0 | 8.3 | 36.1 | 350 | 268 | 0.2745 | 0.0476 |
|  | 2.3 | 5.0 | 5.6 | 53.6 | 525 |  |  |  |
|  | 3.4 | 10.0 | 6.6 | 90.9 | 1000 | 270 | 1.3389 | 1.1171 |
|  | 6.4 | 25.0 | 7.4 | 202.7 | >1000 | 273 | 1.1490 | 0.9237 |
| 16A | <0.1 | 5.0 | 22.9 | 13.1 | <100 | 112 | 0.2535 | 0.0394 |
|  | 0.1 | 5.0 | 15.5 | 19.4 | 200 | 114 | 0.2481 | 0.0294 |
|  | 0.2 | 5.0 | 12.3 | 24.4 | 275 |  |  |  |
|  | 0.4 | 5.0 | 9.4 | 31.9 | 325 |  |  |  |
|  | 0.6 | 10.0 | 13.3 | 45.1 | 550 | 115 | 1.1550 | 0.9435 |
|  | 0.7 | 10.0 | 11.8 | 50.8 | 800 | 119 | 1.6448 | 1.4350 |
|  | 0.9 | 10.0 | 9.9 | 60.6 | 1000 | 120 | 0.2829 | 0.0655 |

TABLE V – Continued

CORE DATA: FORMATION V
  Core Depth 6778'
  Cores 13B, 14B, 15B, 16B Hydroxy-Aluminum Treated
  Cores 13A, 14A, 15A, 16A Untreated Note that Cores 13A, 13B, 14A and 14B are sand packs made from the loose sand. They were pressed using 5000 psig surface pressure. The time the pressure was applied was very short.

Note that Cores 15A, 15B, 16A and 16B are sand packs made from the loose sand and compressed at 5000 psi for 16 hours.

FLOW DATA:

| Core No. | ΔP PSI | Volume, cc. | Time Sec. | Flow Rate cc/Min. | Throughput, cc | Filter No. | Filter Weight + Sample, g | Sand Weight g |
|---|---|---|---|---|---|---|---|---|
| 16B | 1.6 | 10.0 | 7.0 | 85.7 | 1300 | 121 | 0.3490 | 0.1320 |
| | 2.5 | 25.0 | 11.8 | 127.1 | | 123 | 2.0150 | 1.8029 |
| | 3.4 | 25.0 | 9.7 | 154.6 | | 129 | | |
| | 11.4 | 25.0 | 4.1 | 365.8 | | 129 | 2.4506 | 2.2302 |
| | 0.1 | 5.0 | 34.0 | 8.82 | <100 | 111 | 0.3409 | 0.1288 |
| | 0.3 | 5.0 | 13.3 | 22.6 | <150 | 113 | 0.2535 | 0.0315 |
| | 0.6 | 5.0 | 8.1 | 37.0 | 200 | 116 | 0.6698 | 0.4559 |
| | 9.8 | 10.0 | 11.3 | 53.1 | 450 | 117 | 3.4941 | 3.2764 |
| | 0.9 | 10.0 | 10.4 | 57.6 | 850 | | | |
| | 1.1 | 10.0 | 8.9 | 67.4 | 950 | 118 | 0.3299 | 0.1095 |
| | 1.5 | 10.0 | 7.3 | 82.2 | 1300 | 122+24 | 2.5239 | 2.0872 |
| | 2.5 | 25.0 | 10.5 | 142.9 | | 125 | 0.5021 | 0.2821 |
| | 3.5 | 25.0 | 8.5 | 176.5 | | | | |
| | 5.1 | 25.0 | 6.4 | 234.4 | | 126 | 0.3421 | 0.1254 |
| | 10.4 | 25.0 | 4.3 | 348.8 | | 127 | 0.3864 | 0.1740 |
| | 19.4 | 25.0 | 3.0 | 500.0 | | 128 | 0.2898 | 0.0706 |

TABLE VI

CORE DATA: Same as Formation I except cores fired at 400°C. for 8 hours.
  Cores 17B, 18B Treated
  Cores 17A, 18A Untreated

FLOW DATA:

| Core No. | ΔP PSI | Volume, cc. | Time Sec. | Flow Rate cc/Min. | Throughput, cc | Filter No. | Filter Weight + Sample, g | Sand Weight g |
|---|---|---|---|---|---|---|---|---|
| 17A | 0.9 | 5.0 | 180.2 | 1.66 | <50 | | | |
| | 0.9 | 5.0 | 190.3 | 1.58 | <50 | 131* | 0.2778 | 0.0625 |
| | 1.8 | 5.0 | 113.4 | 2.64 | <100 | | | |
| | 3.6 | 5.0 | 60.5 | 4.96 | <100 | 132 | 0.2416 | 0.0221 |
| | 5.0 | 5.0 | 41.9 | 7.16 | <150 | 134 | 0.2473 | 0.0314 |
| | 6.8 | 5.0 | 26.5 | 11.3 | <200 | 136 | 0.2828 | 0.0668 |
| | 11.6 | 5.0 | 14.0 | 21.4 | 280 | 138 | 0.2752 | 0.0600 |
| | 20 | | | | 400 | 140 | 1.0409 | 0.8218 |
| 17B | .8 | 2.0 | 207.8 | 0.58 | <50 | | | |
| | 2.8 | 5.0 | 130.1 | 2.30 | <50 | | | |
| | 2.7 | 5.0 | 135.5 | 2.21 | <100 | | | |
| | 4.3 | 5.0 | 63.8 | 4.70 | <150 | 130 | 0.2438 | 0.0253 |
| | 5.7 | 5.0 | 37.5 | 8.00 | <200 | 133 | 0.2580 | 0.0393 |
| | 7.1 | 5.0 | 21.6 | 13.9 | 200 | 135 | 0.2464 | 0.0341 |
| | 11.6 | 5.0 | 9.8 | 30.6 | 300 | 137 | 0.2815 | 0.0628 |
| | 15.1 | 5.0 | 7.6 | 39.5 | 450 | 139 | 0.3545 | 0.1406 |
| | 19.7 | 10.0 | 11.7 | 51.3 | 575 | 141 | 0.2500 | 0.0317 |
| | 31.2 | 10.0 | 6.7 | 89.6 | 725 | 142 | 0.6488 | 0.4314 |
| | 40.1 | 25.0 | 12.5 | 120.0 | >1000 | 143 | 0.2972 | 0.0777 |
| | 50 | | | | | 144 | 2.5540 | 2.3324 |
| 18A | 0.7 | 5.0 | 165.2 | 1.82 | <50 | 146 | 0.2575 | 0.0312 |
| | 1.1 | 5.0 | 118.4 | 2.53 | <100 | 147 | 0.2527 | 0.0306 |
| | 2.3 | 5.0 | 59.0 | 5.08 | <100 | 148 | 0.2428 | 0.0268 |
| | 3.3 | 5.0 | 44.1 | 6.80 | <150 | 149 | 0.2613 | 0.0346 |
| | 5.0 | 5.0 | 29.2 | 10.3 | <150 | 150 | 0.2560 | 0.0316 |
| | 7.0 | 5.0 | 19.9 | 15.1 | 200 | 151 | 0.3677 | 0.1518 |
| | 9.8 | 5.0 | 10.0 | 30.0 | 280 | 152 | 0.7298 | 0.5103 |
| | <15 | | | | | 154 | 0.6718 | 0.4508 |
| 18B | 0.5 | 5.0 | 275.8 | 1.09 | <50 | | | |
| | 2.2 | 5.0 | 69.2 | 4.33 | <100 | | | |
| | 2.2 | 5.0 | 71.4 | 4.20 | <100 | | | |
| | 3.7 | 5.0 | 45.2 | 6.64 | <150 | | | |
| | 5.4 | 5.0 | 28.3 | 10.6 | <150 | | | |
| | 7.4 | 5.0 | 18.6 | 16.1 | 200 | | | |
| | 10.5 | 5.0 | 11.1 | 27.0 | 280 | 145 | 0.2517 | 0.0284 |
| | 20.4 | 5.0 | 5.1 | 58.8 | 480 | 153 | 0.2862 | 0.0654 |
| | 32.6 | 10.0 | 6.6 | 90.9 | 750 | 155 | 0.2688 | 0.0543 |
| | 39.9 | 25.0 | 12.1 | 124 | 1000 | 156 | 0.4154 | 0.1968 |
| | 60.8 | 25.0 | 6.1 | 246 | | 157 | 0.7210 | 0.5024 |
| | 79.4 | | | | | 158 | 2.2336 | 2.0115 |

TABLE VII

FORMATION CLASSIFICATION INFORMATION

| Formation No. | Core Numbers | Cation Exchange Capacity (Meq/100 gm) | X-Ray Diffraction Data | | OH-Al Effective |
| --- | --- | --- | --- | --- | --- |
| | | | Clay Minerals (Wt. %) | Amorphous Material (Wt. %) | |
| 1 | 3A, 3B, 4A, 4B | 2.0 | 5.0 | 7.0 | yes |
| 2 | 5A, 5B, 6A, 6B, 7A, 7B, 8A, 8B | 1.9 | 1.9 | 16.0 | yes |
| 3 | 9A, 9B, 10A, 10B | 8.9 | 7.8 | 16.0 | yes |
| 4 | 11A, 11B, 12A, 12B | 3.4 | 4.5 | 22.0 | yes |
| 5 | 13A, 13B, 14A, 14B, 15A, 15B, 16A, 16B | 0.6 | 1.0 | 4.0 | very slight |

TABLE VIII

X-RAY DIFFRACTION ANALYSIS (WEIGHT PERCENT)

| Formation No. | Quartz | Dolomite | Plagioclase Feldspar | Potassium Feldspar | Halite | Kaolinite | Illite | Montmorillonite | Amorphous |
| --- | --- | --- | --- | --- | --- | --- | --- | --- | --- |
| 1 | 79.0 | — | 4.2 | 4.5 | — | 3.5 | 1.5 | — | 7.0 |
| 2 | 72.9 | — | 4.8 | 4.1 | 0.9 | 0.5 | 1.4 | — | 16.0 |
| 3 | 68.1 | 1.3 | 5.1 | 3.7 | — | 1.0 | 3.0 | 3.8 | 16.0 |
| 4 | 41.4 | — | 20.9 | 11.0 | — | 4.0 | 0.5 | — | 22.0 |
| 5 | 87.8 | — | 3.1 | 4.2 | — | — | 1.0 | — | 4.0 |

Field demonstrations in two producing oil wells located in the Gulf Coast Area were conducted to show the advantage of the present invention. Both wells which were treated had serious sanding problems and both responded excellently to the hydroxy-aluminum treatment. Both treated formations had clay mineral and X-ray amorphous material content in excess of 10 weight percent and a C.E.C. of greater than 1.0. The details of these demonstrations are set out below.

FIELD DEMONSTRATION NO. 1

The well in this demonstration was a Gulf Coast dual completion well. The treated sand was at the 7,400 foot level and an eight foot interval was treated. The original completion included an epoxy resin sand consolidation operation. The well produced for approximately four years and was producing at a rate of about 150 barrels of oil per day when it sanded up. A diesel oil flush of the well was attempted and was unsuccessful.

As a prerequisite to hydroxy-aluminum treatment the sand in the well was cleaned out with a wash string using source water to circulate sand up the well. After sand had been removed from the well, 500 barrels total of 0.1 molar hydroxy-aluminum solution having an OH/Al ratio of 2.0 was injected down the well and into the formation. Pump pressure was kept below fracturing pressure of the formation. After the hydroxy-aluminum solution was injected the well was then immediately overflushed with 500 barrels of fresh water. This water had less than 1,000 ppm dissolved solids. The well was shut in and the hydroxy-aluminum was aged for 48 hours. The well was then put back on production. Oil production stabilized at 223 barrels of oil per day with a 45 percent water cut. The flowing tubing pressure in the well was 120 psi. The job was quite successful. In other wells in the same general area, the use of a wash string to circulate out the sand has not been successful in the absence of a hydroxy-aluminum treatment. The hydroxy-aluminum treatment total job cost was approximately $4,000. This treatment was in lieu of a workover job which would have involved expenditures in the range of about $50,000.

FIELD DEMONSTRATION NO. 2

This field demonstration occurred in a newly drilled Gulf Coast well. The initial daily production of the newly drilled well was about 480 barrels total fluid. This initial production declined rapidly so that four to five days after the well was originally brought in only a few barrels of fluid per day were being produced. The well was acid treated and again put on production. The production again declined drastically in four to five days to almost no fluid production. Again the well was acidized and put back on production with the same results. A third acid treatment was done and followed with a hydroxy-aluminum treatment as set out below. The treated sand was at approximately 10,100 feet. An eleven foot interval was treated. After such treatment the well was put back on production and total produced fluid was 480 barrels per day of which 355 barrels was oil. After fifteen days the well had stabilized at approximately 400 barrels per day of total fluid of which 300 barrels per day was oil.

The successful acid stimulation and hydroxy-aluminum treatment comprised the following steps in the eleven foot interval. First, 100 gallons per foot of 15 percent HCl was injected into the interval. This was followed by 150 gallons per foot of a mixture of 12 percent HCl and 3 percent HF. 100 gallons per foot of 2-½ percent HCl was then injected into the formation. The above three steps were the same steps used in the earlier acid treatments of the well. Following injection of the 2-½ percent HCl, 15 barrels per foot of a filtered oilfield brine was injected. The brine was used as a buffer liquid and its use following acid is desirable since the presence of acid would tend to inhibit the hydroxy-aluminum reaction. The brine was acidified to pH2 to prevent iron present in the brine from precipitating. This particular brine contains an unusually large amount of dissolved iron and, normally, such acidification would not be required. Next, 20 barrels per foot of 0.1 molar hydroxy-aluminum solution was injected into the interval. The OH/Al ratio of the solution was 2.0. Immediately after the hydroxy-aluminum injection 20 barrels per foot of fresh tap water was injected and the well was shut in to allow the formation to age for 48 hours.

Thus, the present invention provides a method of stabilizing sand in a clay mineral containing formation penetrated by a well. A formation is selected which contains sand and clay mineral which formation is susceptible to sand stabilization on reaction with a hydroxy-aluminum solution. A suitable hydroxy-aluminum solution having the ratio of the hydroxyl groups to Al atoms in the range of from 1.5 to 2.7 is prepared. This solution is injected down the well and contacted with the formation to stabilize sand in the formation. In field operations the hydroxy-aluminum solution preferably has a ratio of hydroxyl groups to Al atoms from 2.0 to 2.4. A 0.1 molar hydroxy-aluminum solution has worked satisfactory in field operations. Most applications of the present method include injecting relatively fresh water into the formation immediately after the injection of the hydroxy-aluminum solution and allowing the hydroxy-aluminum to polymerize in the fresh water. In this instance the fresher the water the better and, therefore, water having less than 1,000 ppm total dissolved solids is most useful.

In one aspect the present invention provides a method of stabilizing sand in clay-containing formations penetrated by a well by first obtaining at least two samples of the formation. One of the samples is treated with an aqueous hydroxy-aluminum solution having a ratio of the hydroxyl groups to Al atoms in the range of from 1.5 to 2.7. Both the treated sample and the untreated sample are prepared for comparative flow tests. The flow tests are conducted on the samples to determine if the treated sample is significantly sand stabilized compared to the untreated sample. Significant sand stabilization will vary with conditions of a formation, but often a 25 percent increase in sand stabilization to flow rate is considered significant. If stabilization is significant, then a hydroxy-aluminum solution is injected down the well penetrating the formation and the formation is contacted with the said solution to stabilize sand in the formation.

In another aspect, the invention provides a method of stabilizing sand in clay-containing formations penetrated by a well by selecting a formation containing sand intersperced with clay mineral and amorphous material are collectively present in an amount of at least 5 weight percent. The X-ray diffraction method used includes in the value for amorphous material content, in addition to the truly amorphous minerals, all those materials not specifically sought, poorly crystalline minerals and line broadening resulting from very fine grained crystals present. A hydroxy-aluminum solution is prepared and injected down the well and contacted with the formation to stabilize sand in the formation. The ratio of the hydroxyl groups to Al atoms in the solution is from 1.5 to 2.7. Somewhat better results may usually be expected when the total clay mineral and amorphous material content is 10 weight percent or greater.

In still another aspect, the invention provides a method of stabilizing sand in clay-containing formations penetrated by a well by obtaining a sample of a formation containing sand and clay mineral and determining the cation exchange capacity of the clay mineral in the sample. The cation exchange capacity is measured by saturating the sample with barium chloride, washing chloride free, then titrating the barium quantitatively with magnesium sulfate. When the cation exchange capacity is greater than about 0.6 Meq/100 gm, the formation is susceptible to sand stabilization by hydroxy-aluminum treatment. Therefore, an aqueous hydroxy-aluminum solution is injected down the well and contacted with the formation to stabilize sand in the formation. The ratio of the hydroxyl groups to Al atoms is in the range of from 1.5 to 2.7. Somewhat better results may generally be expected when the cation exchange is greater than 1.0 Meq/100 gm. In field applications it is preferred to maintain the ratio of hydroxyl groups to Al atoms from 2.0 to 2.4 in the hydroxy-aluminum solution. In most treatments relatively fresh water, preferably having less than 1,000 ppm total dissolved solids, is injected into the formation immediately after the injection of the hydroxy-aluminum solution. The hydroxy-aluminum is then permitted to polymerize in the fresh water for a period of at least 3 hours and preferably 24 hours or more to obtain maximum sand stabilization.

The invention thus provides for sand stabilization to fluid flow in formations containing sand and clay minerals. It is interesting to note that there is no increase in compressive strength in a treated core over an untreated core from a susceptible formation. However, as is apparent from the data above, there is substantial sand stabilization to erosion caused by fluid flow through a treated formation versus an untreated formation. In most sand problem formations, the principal cementing agent holding sand grains in place is clay minerals; thus, stabilization of these clay minerals against dispersion and structural expansion in turn stabilizes the sand against movement by flowing fluids. Hydroxy-aluminum stabilizes the clay minerals by decreasing the expressed surface charge and hence their tendency to disperse and by eliminating structural expansions of the clay mineral.

SUMMARY OF ADVANTAGEOUS USES OF THE INVENTION

Hydroxy-aluminum is beneficially used in wells in which there is a permeability maintenance or sand stabilization problem caused by clay minerals in the formation. For permeability stabilization, it is best applied at the time of original completion of the well as a perforating fluid and subsequently as a gravel packing fluid. This normally allows hydroxy-aluminum solution to be the first non-formation fluid other than perhaps drilling fluid filtrate to contact the formation sand. This ensures that the original formation permeability is being stabilized rather than a permeability that has been partially damaged by other perforating and gravel packing fluids. In old wells, a similar treatment is made after stimulation jobs such as a solvent, surfactant, or acid treatments are done. Also, hydroxy-aluminum solutions are used to kill the well for remedial work when it is suspected that conventional kill fluids may cause damage. It is suitable for use as a pretreatment to cyclic steam stimulation wells, steam flood injection and producing wells where steam condensate may be damaging to the formation permeability because of active clay minerals. This also applied to injection and producing wells in secondary recovery water flood projects.

For sand stabilization, hydroxy-aluminum is used routinely as a perforating and gravel packing fluid during the original completion of the well in those suitable formations which have a history of sand control problems. It is also usefully applied after remedial work such as well bore cleanout, regravel packing and acid treatments. The treatment is often useful in wells which have not sanded up completely but are producing sand at a rate which is a chronic nuisance. That is, the sand causes excessive abrasion of well and surface equipment. The hydroxy-aluminum treatment is done simply by injecting hydroxy-aluminum into the well without pulling any of the well equipment. Another potential application for sand stabilization is in steam flood producing wells. In some formations, sand control problems occur in producing wells simultaneously with steam condensate breakthrough. A hydroxy-aluminum treatment of the well prior to breakthrough may inhibit sand production.

Although certain specific embodiments of the invention have been described herein in detail the invention is not to be limited to only such embodiments but rather only by the appended claims.

I claim:

1. A method of stabilizing sand in a clay containing formation penetrated by a well comprising selecting a formation containing sand and clay mineral which formation is susceptible to sand stabilization on reaction with a hydroxy-aluminum solution, injecting an aqueous hydroxy-aluminum solution down said well and contacting said formation with said solution to stabilize sand in said formation, the ratio of the hydroxyl groups to Al atoms in said solution being in the range of from 1.5 to 2.7.

2. The method of claim 1 further characterized in that the ratio of hydroxyl groups to Al atoms is from 2.0 to 2.4.

3. The method of claim 1 further characterized by injecting relatively fresh water into said formation immediately after the injection of said hydroxy-aluminum solution and allowing said hydroxy-aluminum to polymerize in said fresh water.

4. The method of claim 3 further characterized in that the fresh water has less than 1,000 ppm total dissolved solids.

5. The method of claim 4 where the hydroxy-aluminum is permitted to polymerize in said fresh water for at least about 24 hours.

6. The method of claim 5 where the hydroxy-aluminum solution is 0.1 molar.

7. A method of stabilizing sand in clay-containing formations penetrated by a well comprising obtaining at least two samples of a formation, treating one of said samples with an aqueous hydroxy-aluminum solution, the ratio of the hydroxyl groups to Al atoms in said solution being in the range of from 1.5 to 2.7, preparing the treated sample and the untreated sample for comparative flow tests, conducting comparative flow tests on said samples to determine if the treated sample is significantly sand stabilized compared to the untreated sample and, if such is the case, injecting a hydroxy-aluminum solution down a well penetrating said formation and contacting the formation with said solution to stabilize sand in said formation, the ratio of the hydroxyl groups to Al atoms in said solution being in the range of from 1.5 to 2.7.

8. The method of claim 7 further characterized in that the ratio of hydroxyl groups to Al atoms is from 2.0 to 2.4.

9. The method of claim 7 further characterized by injecting relatively fresh water into said formation immediately after the injection of said hydroxy-aluminum solution and allowing said hydroxy-aluminum to polymerize in said fresh water.

10. The method of claim 9 further characterized in that the fresh water has less than 1,000 ppm total dissolved solids.

11. The method of claim 10 where the hydroxy-aluminum is permitted to polymerize in said fresh water for at least about 24 hours.

12. The method of claim 11 where the hydroxy-aluminum solution is 0.1 molar.

13. A method of stabilizing sand in clay-containing formations penetrated by a well comprising selecting a formation containing sand interspaced with clay mineral and X-ray amorphous material, the said clay mineral and amorphous material being collectively present in an amount of at least 5 weight percent, injecting an aqueous hydroxy-aluminum solution down said well and contacting said formation with said solution to stabilize sand in said formation, the ratio of the hydroxyl groups to Al atoms in said solution being in the range of from 1.5 to 2.7.

14. The method of claim 13 further characterized in that the ratio of hydroxyl groups to Al atoms is from 2.0 to 2.4.

15. The method of claim 13 further characterized in that the total weight percent of the clay mineral and amorphous material is at least 10 percent.

16. The method of claim 13 further characterized by injecting relatively fresh water into said formation immediately after the injection of said hydroxy-aluminum solution and allowing said hydroxy-aluminum to polymerize in said fresh water.

17. The method of claim 16 further characterized in that the fresh water has less than 1,000 ppm total dissolved solids.

18. The method of claim 17 where the hydroxy-aluminum is permitted to polymerize in said fresh water for at least about 24 hours.

19. The method of claim 18 where the hydroxy-aluminum solution is 0.1 molar.

20. A method of stabilizing sand in clay-containing formations penetrated by a well comprising obtaining a sample of a formation containing sand and clay mineral, determining the cation exchange capacity of the clay mineral in said sample, when the said cation exchange capacity is greater than about 0.6 Meq/100 gm injecting an aqueous hydroxy-aluminum solution down a well and contacting said formation with said solution to stabilize sand in said formation, the ratio of the hydroxyl groups to Al atoms in said solution being in the range of from 1.5 to 2.7.

21. The method of claim 20 further characterized in that said cation exchange capacity is greater than 1.0 Meq/100 gm.

22. The method of claim 20 where the ratio of hydroxyl groups to Al atoms is from 2.0 to 2.4.

23. The method of claim 20 further characterized by injecting relatively fresh water into said formation immediately after the injection of said hydroxy-aluminum solution and allowing said hydroxy-aluminum to polymerize in said fresh water.

24. The method of claim 23 further characterized in that the fresh water has less than 1,000 ppm total dissolved solids.

25. The method of claim 24 where the hydroxy-aluminum is permitted to polymerize in said fresh water for at least about 24 hours.

26. The method of claim 25 where the hydroxy-aluminum solution is 0.1 molar.

27. A method of stabilizing sand in clay containing formations penetrated by a well comprising selecting a formation containing sand and clay mineral which formation is susceptible to sand stabilization on reaction with a hydroxy-aluminum solution, acidizing said formation by injecting acid down a well and into said formation, injecting a buffer liquid down said well after said acid, injecting an aqueous hydroxy-aluminum solution down said well after said buffer liquid and contacting said formation with said solution to stabilize sand in said formation, the ratio of the hydroxyl groups to Al atoms in said solution being in the range of from 1.5 to 2.7.

28. The method of claim 27 further characterized in that the ratio of hydroxyl groups to Al atoms is from 2.0 to 2.4.

29. The method of claim 27 further characterized by injecting relatively fresh water into said formation immediately after the injection of said hydroxy-aluminum solution and allowing said hydroxy-aluminum to polymerize in said fresh water.

30. The method of claim 29 further characterized in that the fresh water has less than 1,000 ppm total dissolved solids.

31. The method of claim 30 where the hydroxy-aluminum is permitted to polymerize in said fresh water for at least about 24 hours.

32. The method of claim 31 where the hydroxy-aluminum solution is 0.1 molar.

33. A method of stabilizing sand in a formation containing sand and clay mineral which formation is susceptible to sand stabilization on reaction with a hydroxy-aluminum solution comprising contacting said formation with an aqueous hydroxy-aluminum solution to stabilize sand in said formation, the ratio of the hydroxyl groups to Al atoms in said solution being in the range of from 1.5 to 2.7.

34. The method of claim 33 further characterized in that the ratio of hydroxyl groups to Al atoms is from 2.0 to 2.4.

35. The method of claim 33 further characterized by contacting said formation with relatively fresh water after said formation is contacted with hydroxy-aluminum solution and allowing said hydroxy-aluminum to polymerize in said fresh water.

36. The method of claim 35 further characterized in that the fresh water has less than 1,000 ppm total dissolved solids.

37. The method of claim 36 where the hydroxy-aluminum is permitted to polymerize in said fresh water for at least about 24 hours.

38. The method of claim 37 where the hydroxy-aluminum solution is 0.1 molar.

39. A method of stabilizing sand in a formation penetrated by a well and containing sand and clay mineral which formation is susceptible to sand stabilization on reaction with a hydroxy-aluminum solution comprising injecting an aqueous hydroxy-aluminum solution down a well and contacting said formation with said solution to stabilize sand in said formation, the ratio of the hydroxyl groups to Al atoms in said solution being in the range of from 1.5 to 2.7.

40. The method of claim 39 further characterized in that the ratio of hydroxyl groups to Al atoms is from 2.0 to 2.4.

41. The method of claim 39 further characterized by injecting relatively fresh water into said formation immediately after the injection of said hydroxy-aluminum solution and allowing said hydroxy-aluminum to polymerize in said fresh water.

42. The method of claim 41 further characterized in that the fresh water has less than 1,000 ppm total dissolved solids.

43. The method of claim 42 where the hydroxy-aluminum is permitted to polymerize in said fresh water for at least about 24 hours.

44. The method of claim 43 where the hydroxy-aluminum solution is 0.1 molar.

* * * * *